United States Patent
Boone et al.

(10) Patent No.: US 11,909,583 B1
(45) Date of Patent: Feb. 20, 2024

(54) PREDICTIVE DYNAMIC CACHING IN EDGE DEVICES WHEN CONNECTIVITY MAY BE POTENTIALLY LOST

(71) Applicant: INTERNATIONAL BUSINESS MACHINES CORPORATION, Armonk, NY (US)

(72) Inventors: Michael Boone, Lutz, FL (US); Atul Mene, Morrisville, NC (US); Jeremy R. Fox, Georgetown, TX (US); Tushar Agrawal, West Fargo, ND (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/930,816

(22) Filed: Sep. 9, 2022

(51) Int. Cl.
*H04L 41/0686* (2022.01)
*H04L 41/16* (2022.01)

(52) U.S. Cl.
CPC .......... *H04L 41/0686* (2013.01); *H04L 41/16* (2013.01)

(58) Field of Classification Search
CPC ..... H04L 41/0686; H04L 41/16; H04L 67/34; H04L 63/08; H04L 67/568; H04L 67/12; H04L 67/51; H04W 12/069; H04W 4/44; H04W 8/24
See application file for complete search history.

(56) References Cited

U.S. PATENT DOCUMENTS

| | | | |
|---|---|---|---|
| 7,130,964 B2 | 10/2006 | Ims et al. | |
| 7,349,943 B2 | 3/2008 | Lin et al. | |
| 7,441,011 B2 | 10/2008 | Lin et al. | |
| 8,635,271 B1 | 1/2014 | Adya et al. | |
| 10,938,634 B1 | 3/2021 | Cruise et al. | |
| 11,013,043 B2 | 5/2021 | Schmitz et al. | |
| 11,048,248 B2 | 6/2021 | Cella et al. | |
| 2003/0074204 A1 | 4/2003 | Krothapalli et al. | |
| 2012/0220308 A1* | 8/2012 | Ledlie | H04W 4/029 455/456.1 |
| 2015/0074222 A1* | 3/2015 | Liang | H04L 67/288 709/214 |
| 2018/0097905 A1* | 4/2018 | Todasco | H04L 67/02 |

(Continued)

OTHER PUBLICATIONS

IoT Device Applications Discovery; Jun. 23, 2022; Palo Alto Networks, Inc.; pp. 1-8. (Year: 2022).*

(Continued)

*Primary Examiner* — Muhammad Raza
(74) *Attorney, Agent, or Firm* — CANTOR COLBURN LLP; Tihon Poltavets

(57) ABSTRACT

Embodiments provide predictive dynamic caching in edge devices when connectivity may be potentially lost. A technique includes registering devices that require a connectivity to a cloud server via a network and predicting a likelihood of a network outage of the connectivity to the network for the devices having been registered. The technique includes determining data to cache for each of the devices by analyzing traffic for each of the devices to the cloud server, at least one piece of the data being currently in use by at least one of the devices. The technique includes responsive to predicting the likelihood of the network outage, caching the data to edge devices, and responsive to the connectivity to the network being restored, removing the data cached on the edge devices.

12 Claims, 5 Drawing Sheets

(56) References Cited

U.S. PATENT DOCUMENTS

| | | | | |
|---|---|---|---|---|
| 2019/0064791 | A1 | 2/2019 | Cella et al. | |
| 2019/0306121 | A1* | 10/2019 | Anderson | H04L 63/0236 |
| 2020/0314614 | A1* | 10/2020 | Moustafa | H04L 67/34 |
| 2021/0212168 | A1* | 7/2021 | Yoden | H04W 88/06 |
| 2022/0254113 | A1* | 8/2022 | Xu | G06V 20/20 |
| 2022/0322157 | A1* | 10/2022 | Yamagishi | H04W 28/26 |

OTHER PUBLICATIONS

Anonymous, "Method and System for Predictively Caching/De-caching Anticipated Map on Mobile Device", IP.com, IPCOM000253836D, May 9, 2018, 3p.

Anonymous, "Predictive Temporal Pre-caching and Transaction Execution", ip.com, IPCOM000257717D, Mar. 5, 2019, 3p.

Anonymous, "System and Method to Provide Cognitive Remediation Insights for Continuous Operations in Managing an Application with Mobile and Edge Devices which Can Experience Unplanned Outages Resulting in Loss of Business", ip.com, IPCOM000264548D, Jan. 5, 2021, 11p.

CatchBox, [online]; [retrieved on Aug. 23, 2022]; retrieved from the Internethttps://www.appliansys.com/cachebox/other/tech/overviews/introduction/.

Mell, "The NIST Definition of Cloud Computing", NIST Special Publication 800-145, Sep. 2011, 7 pages.

Said, "Proactive Caching at the Edge Leveraging Influential User Detection in Cellular D2D Networks", Future Internet 2018, mdpi.com, Sep. 21, 2018, 18 p.

Tang, "Reliable Mobile Edge Service Offloading Based on P2P Distributed Networks", Symmetry 2020, 12, 821, mdpi.com; May 16, 2020, 21p.

Zhao, "A Survey on Caching in Mobile Edge Computing", Hindawi, Wireless Communications and Mobile Computing, vol. 2021, Article ID 5565648, Nov. 10, 2021, 21 pages.

* cited by examiner

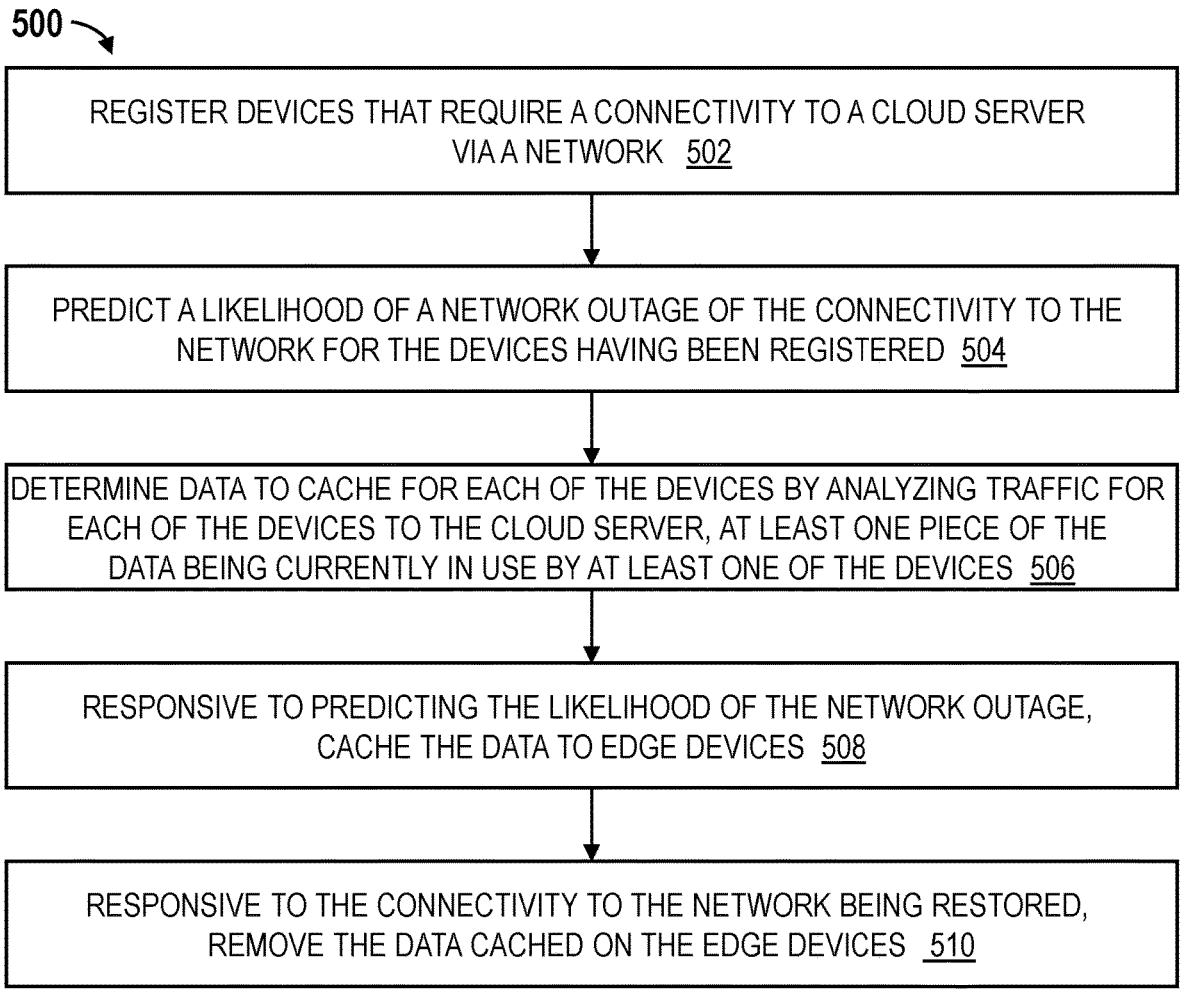

US 11,909,583 B1

PREDICTIVE DYNAMIC CACHING IN EDGE DEVICES WHEN CONNECTIVITY MAY BE POTENTIALLY LOST

BACKGROUND

The present invention generally relates to computer systems, and more specifically, to computer-implemented methods, computer systems, and computer program products configured and arranged to provide predictive dynamic caching in edge devices when connectivity may be potentially lost.

In distributed computing environments, there can be numerous jobs or queries arriving as workloads to be processed on processors in the computing environment. A distributed computing environment may consist of multiple software components that are on multiple computers run as a system. The computers that are in a distributed system can be physically close together and connected by a local network, or they can be geographically distant and connected by a wide area network. A distributed system can consist of any number of possible configurations.

The Internet of things (IoT) describes physical objects or groups of such objects with sensors, processing ability, software, and other technologies that connect and exchange data with other devices and systems over the Internet or other communications networks. The field has evolved due to the convergence of multiple technologies, including ubiquitous computing, commodity sensors, increasingly powerful embedded systems, and machine learning. Traditional fields of embedded systems, wireless sensor networks, control systems, automation (including home and building automation), independently and collectively enable the IoTs. Also, IoT technology is sometimes synonymous with products pertaining to the concept of the "smart home", including devices and appliances (such as lighting fixtures, thermostats, home security systems, cameras, and other home appliances) that support one or more common ecosystems, and can be controlled via devices associated with that ecosystem, such as smartphones and smart speakers.

SUMMARY

Embodiments of the present invention are directed to computer-implemented methods for predictive dynamic caching in edge devices when connectivity may be potentially lost. A non-limiting computer-implemented method includes registering devices that require a connectivity to a cloud server via a network and predicting a likelihood of a network outage of the connectivity to the network for the devices having been registered. The method includes determining data to cache for each of the devices by analyzing traffic for each of the devices to the cloud server, at least one piece of the data being currently in use by at least one of the devices. The method includes responsive to predicting the likelihood of the network outage, caching the data to edge devices, and responsive to the connectivity to the network being restored, removing the data cached on the edge devices.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 is a flowchart of a computer-implemented method for predictive dynamic caching in edge devices when connectivity may be potentially lost according to one or more embodiments of the present invention.

DETAILED DESCRIPTION

Figure 1:
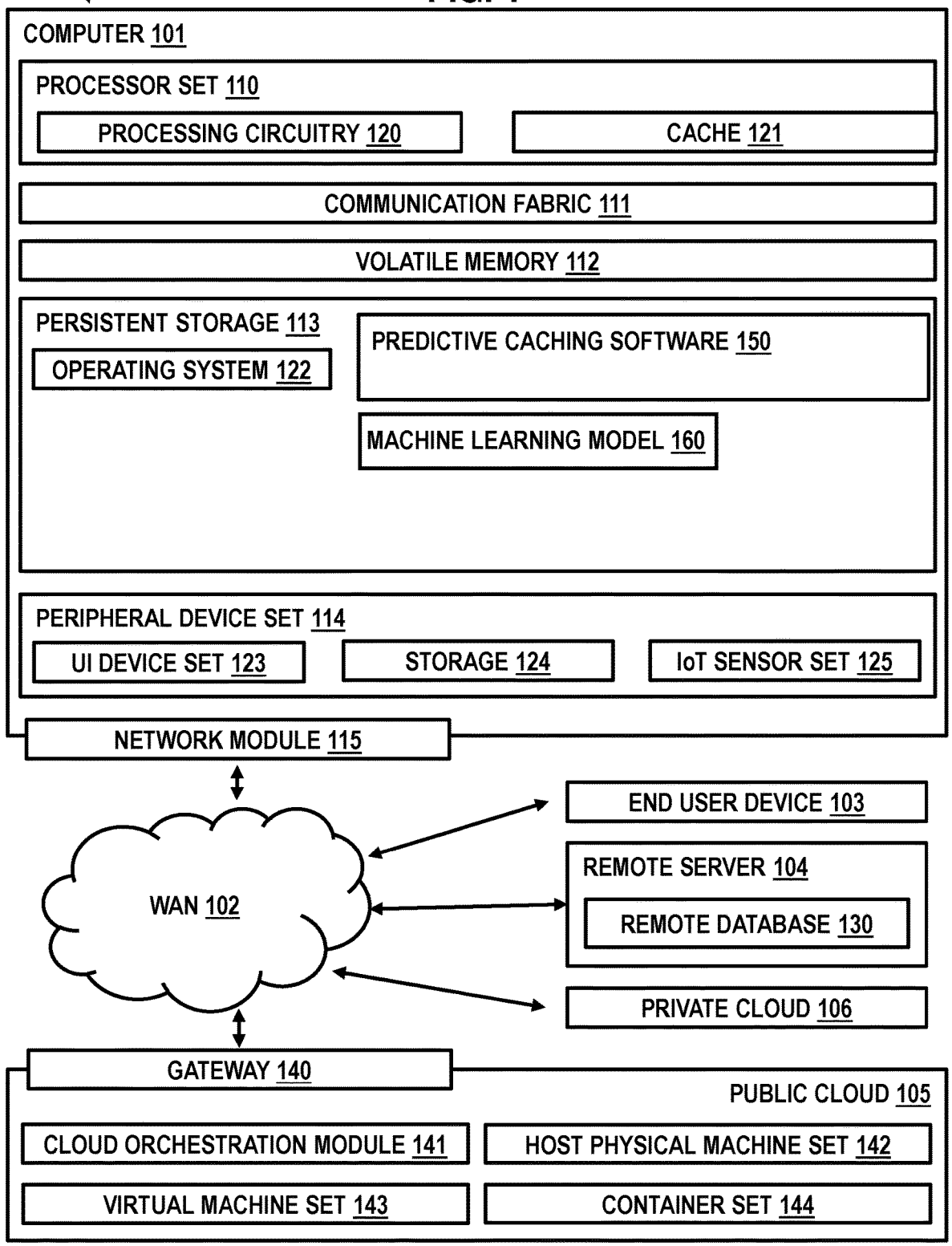
FIG. 1 depicts a block diagram of an example computing environment for use in conjunction with one or more embodiments of the present invention.

One or more embodiments of the invention describe computer-implemented methods, computer systems, and computer program products configured and arranged to provide predictive dynamic caching in edge devices when connectivity may be potentially lost (i.e., in advance of connectivity loss) with cloud servers.

The recent trend of edge computing extends cloud computing and the Internet of Things (IoT) to the edge of the network. Edge computing moves more computational power and resources closer to end users by increasing the number of endpoints and locating them nearer to the consumers, which can be users or devices. In general, edge computing architectures are built on existing technologies and established paradigms for distributed systems, which means that edge devices include many well-understood components available to create the most effective architectures to build and deliver edge improvements, as discussed in one or more embodiments.

The IoT devices can connect to the cloud server and can share the captured data for processing, and at the same time, the IoT devices receive computation results from the cloud server. In various situations, while performing cloud computation, Internet connectivity can be lost for various reasons like when a ship is sailing on the sea, when weather conditions change, when internet range is too great, etc. Taking the ship example, the ship is not able to perform cloud computation, and during that time, edge computing is performed according to one or more embodiments. Both the cloud computing and edge computing having some advantages over each other. In various situations, if the system predicts (in advance) that the that Internet connectivity will be lost, embodiments provide methods and systems to keep the appropriate data cached in a proactive manner until the Internet connection is restored.

In one or more embodiments, the system performs a method for predictive caching in edge device for instances of potential network outages. The system is configured to identify an inventory of IoT devices, scan a route for available towers and predict potential outages, and scan weather predictions and predict potential outages. The system is configured to analyze communications, for each IoT device from the inventory of IoT devices, to a cloud sever and identify data to cache, where some of the data is currently in use by the IoT devices. The system is configured to, responsive to determining that a potential network outage is possible based on one or more thresholds being reached, cache the data to edge devices; responsive to connectivity being restored or the one or more thresholds no longer being reached, the system is configured delete the cached data on the edge devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as predictive caching software 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
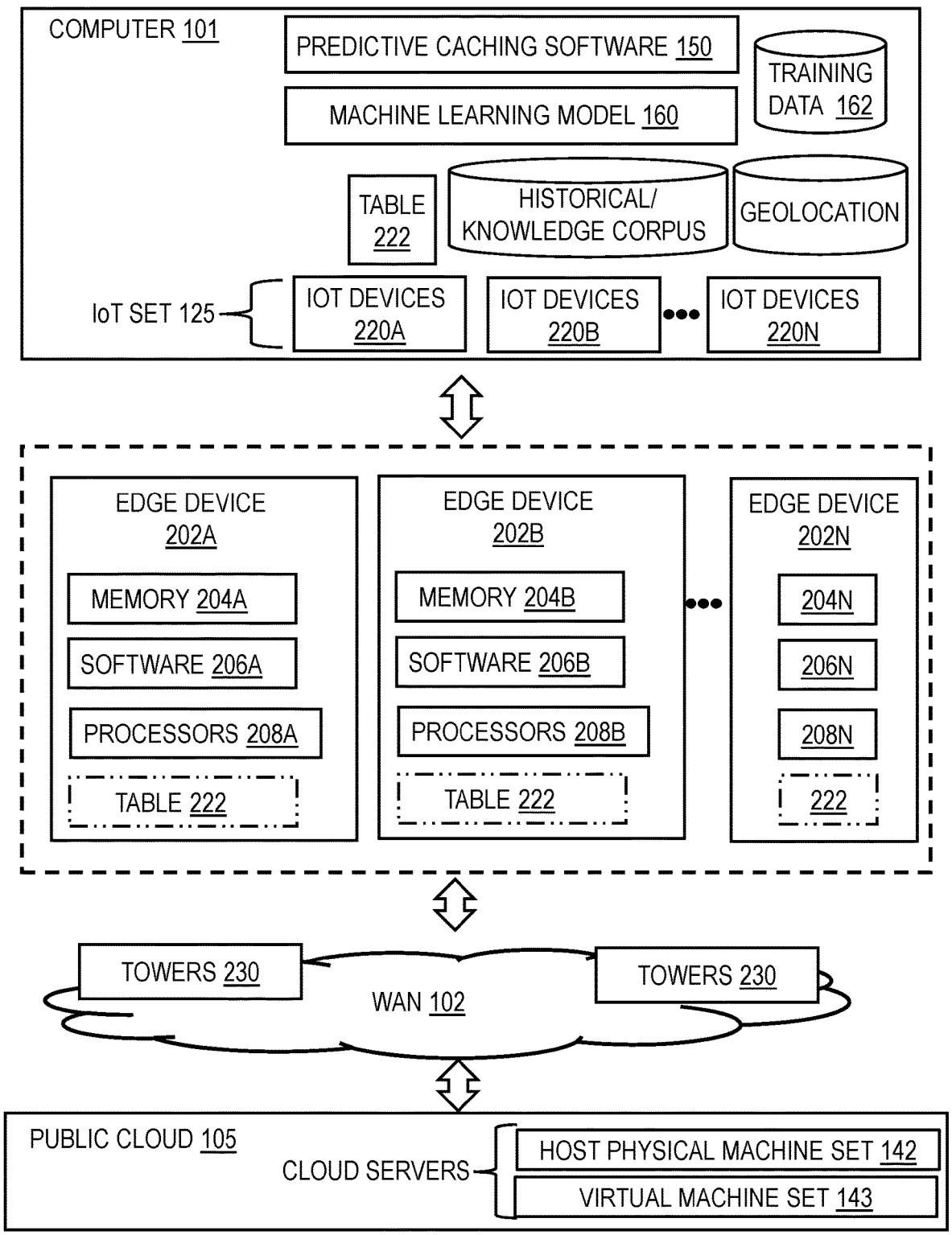
FIG. 2 depicts a block diagram of the example computing environment configured to provide predictive dynamic caching in edge devices when connectivity may be potentially lost according to one or more embodiments of the present invention.

FIG. 2 depicts the computing environment 100 with further details for predictive caching in edge devices in advance of predictive/potential network outages with cloud servers according to one or more embodiments. In FIG. 2, some details of the computing environment 100 may be omitted so as not to obscure the figure. FIG. 2 illustrates IoT devices 220A, 220B through 220N, where N represents the last of the IoT devices. The IoT devices 220A, 220B, 220N can generally be referred to as IoT devices 220. The IoT devices 220 may be part of the IoT set 125. FIG. 2 illustrates edge devices 202A, 202B through 202N, where N represents the last of the devices. The edge devices 202A, 202B, 202N can generally be referred to as edge devices 202. The edges devices 202 are operatively coupled to the IoT devices 220, for example, via a LAN.

A portion of the computing environment 100 may be mobile or part of a mobile platform that loses connection to the WAN 102. For example, the IoT devices 220 which form an IoT ecosystem, along with the computer 101 and edge devices 202, can be part of a transportation vehicle such as a ship, an airplane, a spaceship, a train, a bus, an underground vehicle, an underwater vehicle, etc. In some examples, the IoT devices 220 can have different sensors, and the sensors are gathering data and sending the same to cloud server. Moreover, the IoT devices 220 can be mobile, such as moving vehicles, robots, machines, etc., with smart sensors enabled. For explanation purposes and not limitation, an example scenario is provided that uses a ship traveling a route in the sea or ocean as the transportation vehicle or mobile platform. It should be appreciated that the transportation vehicle is not limited to a ship but could be any other type of transportation vehicle or mobile platform.

Figure 3:
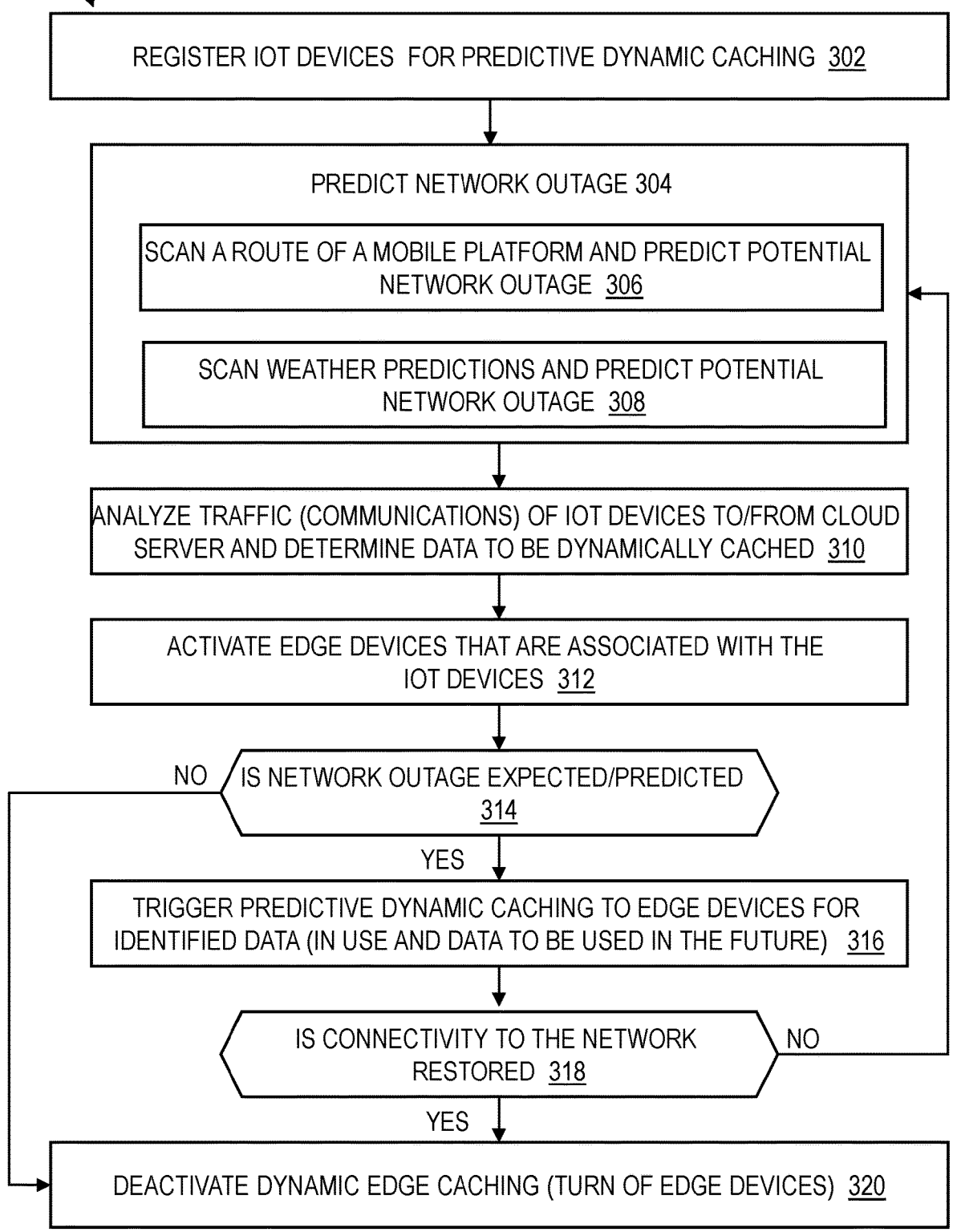
FIG. 3 is a flowchart of a process of predictive dynamic caching in edge devices when connectivity may be potentially lost according to one or more embodiments of the present invention.

FIG. 3 is a flowchart of a computer-implemented method 300 for predictive dynamic caching in edge devices when connection to cloud servers may be potentially lost according to one or more embodiments. In the description of the computer-implemented method 300 in FIG. 3, reference can also be made to FIGS. 1 and 2.

At block 302 of the computer-implemented method 300, the predictive caching software 150 is configured to register a list of IoT devices 220A, 220B through 220N. The predictive caching software 150 creates and stores a table 222 with an inventory list of the IoT devices 220 that are registered for predictive caching. During registration of each respective IoT devices 220, the table 222 may include the type of IoT devices, the type of sensor(s), the type of information captured by the sensors of the IoT devices, the type of data transmitted and received by the IoT devices, the destination for the information (including domain name, URL, IP address, etc.), e.g., cloud servers in the public cloud 105 (or private cloud 106), the type of processing/computation required for the (sensor) data, authentication information associated with the IoT device, software applications utilized by and/or on behalf of the IoT devices, schedules associated with when and how the IoT devices access the cloud servers, etc. The table 222 includes the registration of the operating environment for each of the IoT devices, the data the IoT devices are capturing and sending to the cloud server for analysis, and the edge devices 202 that can perform predictive caching for the IoT devices 220 in preparation for a potential and during the network outage. The table 222 (illustrated with dashed lines) may optionally be stored on one or more edge devices 202 in preparation for the network outage and/or transmitted to the edge devices 202 upon the prediction of the network outage.

In one example, one or more IoT devices 220 can contain and/or capture sensitive data, and those IoT devices 220 can be (selectively) registered to communicate with selected edge devices 202 preconfigured to handle the sensitive data; those IoT devices 220 and selected edge devices 202 can have the same encryption protocols and methods for handling the sensitive (e.g., confidential) data.

A network outage is a loss of connectivity between the IoT devices 220 and the cloud servers, where the IoT devices 220 communicate with the cloud servers in the public cloud 105 via the WAN 102. In one or more embodiments, the IoT devices 220 may communicate with cloud servers in the private cloud 106. Particularly, a network outage for the IoT devices 220 (including the computer 101) is a loss of connectivity to the WAN 102, which results in a loss of communicating data to and from the WAN 102. The cloud servers can be representative of one or more of the host physical machines in the host physical machine set 142 and/or one or more of the virtual machines in the virtual machine set 143.

Referring to FIG. 3, at block 304, the predictive caching software 150 is configured to predict a potential network outage of the connectivity between the IoT devices 220 and the cloud servers, which is a loss of connectivity between the IoT devices 220 and the WAN 102. As part of the process of predicting a network outage of connectivity between the IoT devise 220 and the cloud servers in advance of the actual network outage, the predictive caching software 150 is configured to scan the route being traveled by the transportation vehicle (e.g., the ship) in order to predict the potential network outage, at block 306. The route being taken by the ship is predetermined in advance and provided to the predictive caching software 150. Continuous updates of the route and position of the transportation vehicle are provided to the predictive caching software 150. The route can be the path currently being taken by any mobile platform, in which the route is known in advance, although the route can be modified. The predictive caching software 150 is provided with the coverage of towers 230 and satellites accessible by the IoT devices 220 for providing communications with the WAN 102. The predictive caching software 150 determines and/or is provided with the locations/coverage of towers 230 and satellites in relation to both the location of the transportation vehicle and the route. Also, the predictive caching software 150 is configured to scan weather predictions associated with the present location and the route of the transportation vehicle in order to predict the potential network outage. The weather data can be fed to the predictive caching software 150. The weather data is associated with the present location of the transportation vehicle and future locations of the transportation vehicle along with route. The predictive caching software 150 determines the potential network outage by weighing each factor discussed above, including weather, present location, route, relative distance to towers/satellites, tower coverage, etc. As a simple example, scores may be applied to the factors, and the scores can be summed. If the summed score meets or exceeds a threshold, the network outage is predicted to occur. If the summed score does not meet the threshold, no network outage is predicted to occur. During stormy seasons, more weight may be given to weather data. Geolocation mapping may be utilized to provide location insight(s) for the potential network outage and when connectivity may be restored. The predictive caching software 150 is configured to use a location map and historical data to know where there can be a potential network outage. A combination of methods discussed herein can be utilized by the predictive caching software 150 to predict the potential network outage.

It should be appreciated that the predictive caching software 150 predicts an upcoming network availability outage during travel and/or while static in any place. The predictive caching software 150 is configured to predict/identify the duration of the network outage and to predict what types of contextual situation is to be analyzed during the network outage, so that the edge caching can perform required computations. When the network outage is predicted and/or identified, the predictive caching software 150 (e.g., using the table 222) is configured to predict what types of contextual situation may happen. A knowledge corpus can be checked for types of contextual analysis associated with the registered IoT devices 220. The predictive caching software 150 can also use historical learning to identify the types of contextual situations that might occur during the potential network outage. The predictive caching software 150 is configured to determine or predict the types of computational data required during the expected network outage. For example, using the table 222 with information for each of the registered IoT devices 220, the predictive caching software 150 is configured to determine computations currently being executed for the IoT devices 220 while there is connectivity to the network and determine future computations for the IoT devices 220. The future computations may be needed during the expected network outage.

As noted above, the prediction includes the expected duration of the network outage, for example, seconds, minutes, hours, days, etc. The predictive caching software 150 predicts the duration and/or distance that connectivity to the network (e.g., WAN 102) will not be available, for example, using historical learning from a knowledge corpus. For example, historical learning is utilized to identify what types of contextual situations are present during the potential network outage.

The predictive caching software 150 may employ rules-based algorithms for predictive caching in the edge devices in advance of predictive/potential outages with cloud servers. In one or more embodiments, the predictive caching software 150 may employ, call, and/or be integrated with a machine learning model 160 (e.g., an artificial neural network) that has been trained to predict potential network outages for loss of connectivity between the registered IoT devices 220 and the cloud servers, which means there is a loss of connectivity between the IoT devices 220 and the WAN 102. In one example, there can be two classifications/categories such as a first classification denoting a likelihood (Yes) that there is going to be a network outage and a second classification denoting that there is not a likelihood (No) that there is going to be a network outage. The output from the machine learning model 160 can be "Yes" which predicts that a potential network outage is likely to occur or "No" which predicts that a potential network outage is unlikely to occur. If two classifications (Yes or No for potential network outages) are utilized as the output from the machine learning model 160, the predictive caching software 150 applies the predicted network outage in order to activate edge devices for caching in advance of the potential network outage. In one or more embodiments, the predictive caching software 150 may integrate the output from the machine learning model 160 with the summed score to increase or decrease an urgency associated with the potential network outage. For example, a prediction (Yes) that the potential network outage will occur from the machine learning model 160 plus reaching a predetermined high-level for the summed score of the factors is an indication of an urgency, which may cause all edge devices 202 to be activated for immediate caching. In addition to the predetermined high-level value, there can be a predetermined mid-level value and low-level value associated with the summed score, which do not trigger the urgency. Further discussion regarding the machine learning model 160 is provided below.

Referring to FIG. 3, At block 310, the predictive caching software 150 is configured to analyze the communications (i.e., traffic of data) of IoT devices 220 to and from the cloud servers and identify data to be dynamically cached by the edge devices 202. At block 312, the predictive caching software 150 is configured to activate the edge devices 202 that are associated with the IoT devices 220 that have been registered in advance. The predictive caching software 105 wakes up the edge devices 202 to proactively prepare for receipt of data. When edge caching is initiated, the predictive caching software 150 activates a sufficient number of edge devices which are required for the computation during the network outage to maintain the capability. For example, by parsing the table 222, the predictive caching software 150 determines the particular edge devices 202 associated with the registered IoT devices 220. Accordingly, the identified edge devices 202 are activated to support their corresponding IoT devices 220. In one or more embodiments, the predictive caching software 150 is configured to activate a number of the edge devices 202 that correspond to (i.e., can store) the amount of data expected to be predictively cached by the edge devices 202. In one or more embodiments, the duration of the potential network outage is expected to be for an expected period of time. Using the table 222, the predictive caching software 150 is configured to determine the amount of data to be downloaded from each of the IoT devices 220 to a respective edge device 202 during the expected period of time. Accordingly, the predictive caching software 150 activates the number of edge devices 202, which may be 1, 2, 3, and/or N edge devices, which are needed to predictively cache the amount of data from the IoT devices 220 during the potential network outage. Therefore, the predictive caching software 150 causes the corresponding number of edge devices 202 to be powered on in preparation for predictive caching in advance of the network outage. The edges devices 202A, 202B, 202N each include their respective memory 204A, 204B, 204N, software 206A, 206B, 206N, and processors 208A, 208B, 208N to operate as discussed herein.

Further, there may be edge computing capacity limits during prediction. For example, the predictive caching software 150 is configured to continuously estimate edge computing capacity during the edge computation while the network outage is occurring. Estimating the edge computing capacity for the number of edge devices 202 is based on present usage of the edge devices 202 by the IoT devices 220 and future usage (e.g., according to the table 222 and/or historical/knowledge corpus) of the edge devices 202 by the IoT devices 220. The predictive caching software 150 can identify changes in the edge computing demand during the network outage and can correspondingly activate more edge devices 202 or deactivate edge devices 202.

At block 314, the predictive caching software 150 is configured to check if a potential network outage is expected or predicted. If not, the predictive caching software 150 is configured to deactivate the dynamic edge caching by powering off the edge devices 202, at block 320. In one example, the predictive caching software 150 may place the edge device 202 in a standby mode.

At block 316, if (Yes) the potential network outage is expected/predicted, the predictive caching software 150 is configured to trigger predictive dynamic caching to the edge devices 202 for the identified data in use and data expected to be in use for the registered IoT devices 220 during the expected period of time for the potential network outage. The predictive caching software 150 is configured to cause data from the IoT devices 220 to be transmitted to and cached at the respective edge devices 202 in advance of the potential network outage. The IoT devices 220 send application data to the edge devices 202. The IoT devices 220 may store application data, sensor data, etc., on the edge devices 202. The edge devices 202 are configured to cache the received data, and when connection is subsequently restored, the edge devices 202 are configured to transmit the data to the respective cloud servers, for example, via WAN 102. The activated edge devices 202 are an interface for communications between the registered IoT devices 220 and the WAN 102 including the cloud servers, in response to the edge devices 202 being activated. Moreover, the data is transferred up to the edge device 202 from the IoT devices 220.

Edge to edge device protocols are established and known as part of setup. During edge computing, no Internet connectivity is required, and the edge devices can perform edge computing; in this case, device to device communication protocols can be used between the edge devices and IoT devices.

Additionally, in response to predicting the potential network outage, data can be sent in advance from the IoT devices 220 to the cloud servers. Cloud computing exists during the initial genesis state. For cloud computation on the cloud servers, Internet network connectivity is required, and during that time, the gathered data is sent to cloud server on the public cloud 105.

In the opposite communication direction, the software 206 of the edge devices 202 is configured to download data from the cloud servers in anticipation of the potential network outage, for example, on behalf of the IoT devices 220 before they need the data. The required data is proactively downloaded in preparation for the expected outage such that the relevant data from cloud server can be used during network outage by the IoT devices 220. The downloaded data is stored locally on the active edge devices 202 for future use during the network outage. The downloaded data from cloud server is used by the edge devices 202 during edge computing. Edge devices 202 can be enabled and disabled (as required), based on the context. There can be various edge devices 202 in operation, and when the edge devices are not required, the predictive caching software 150 is configured to switch off the edge devices 202.

In one example, the predictive caching software 150 parses the table 222 and determines that the IoT device 220A is utilized to check banking information at time "J" which will occur in the future during the expected network outage; in that case, the predictive caching software 150 can cause software 206A to download, in advance, from the banking cloud server the account information associated with the IoT device 220A such that the account information is accessible by the IoT device 220A at the usual time "J". For authentication to the banking cloud server, the software 206A uses prestored authentication information associated with the IoT device 220A from the table 222 in order to communicate with the banking cloud server. During the network outage, the user of IoT device 220A may not be able to make a transaction until connectivity is restored.

Referring to FIG. 3, at block 318, the predictive caching software 150 is configured to check if connectivity to the network is restored. If (No) connectivity to the network (e.g., WAN 102) is not restored, flow proceeds back to block 304. If (Yes) connectivity to the network (e.g., WAN 102) is restored, flow proceeds to block 320 in which the predictive dynamic edge caching is deactivated. For example, the predictive caching software 150 shrinks edge computing footprint upon reentry into the cloud environment. When the network is established, then predictive caching software 150 gradually deactivates/switches off the edge devices 202 to reduce the edge caching capability and reinitiate cloud computing by the cloud servers.

Further, the predictive caching software 150 is configured to update all historical data and knowledge corpus obtained during each network outage. The predictive caching software 150 can provide edge updates to all cloud computing systems and the knowledge corpus is updated with all data and tracking thereof that occurred while the system was in edge mode (i.e., when the edge devices 202 are activated). This data can be utilized to increase the capability of the predictive caching software 150 and/or provided updated training to the machine learning model 160.

In addition to providing predictive data caching and computations, one or more embodiments can utilize edge caching to counter a distributed denial-of-service (DDos) attack on cloud connectivity. For example, the IoT enabled ecosystem connecting to the cloud computing is triggered in cases of a DDos attack based on abnormal network activity. The edge caching can address the service disruptions for critical services, for example, such as user identification authentication, records entered from users for cloud computing, etc.

Figure 4:
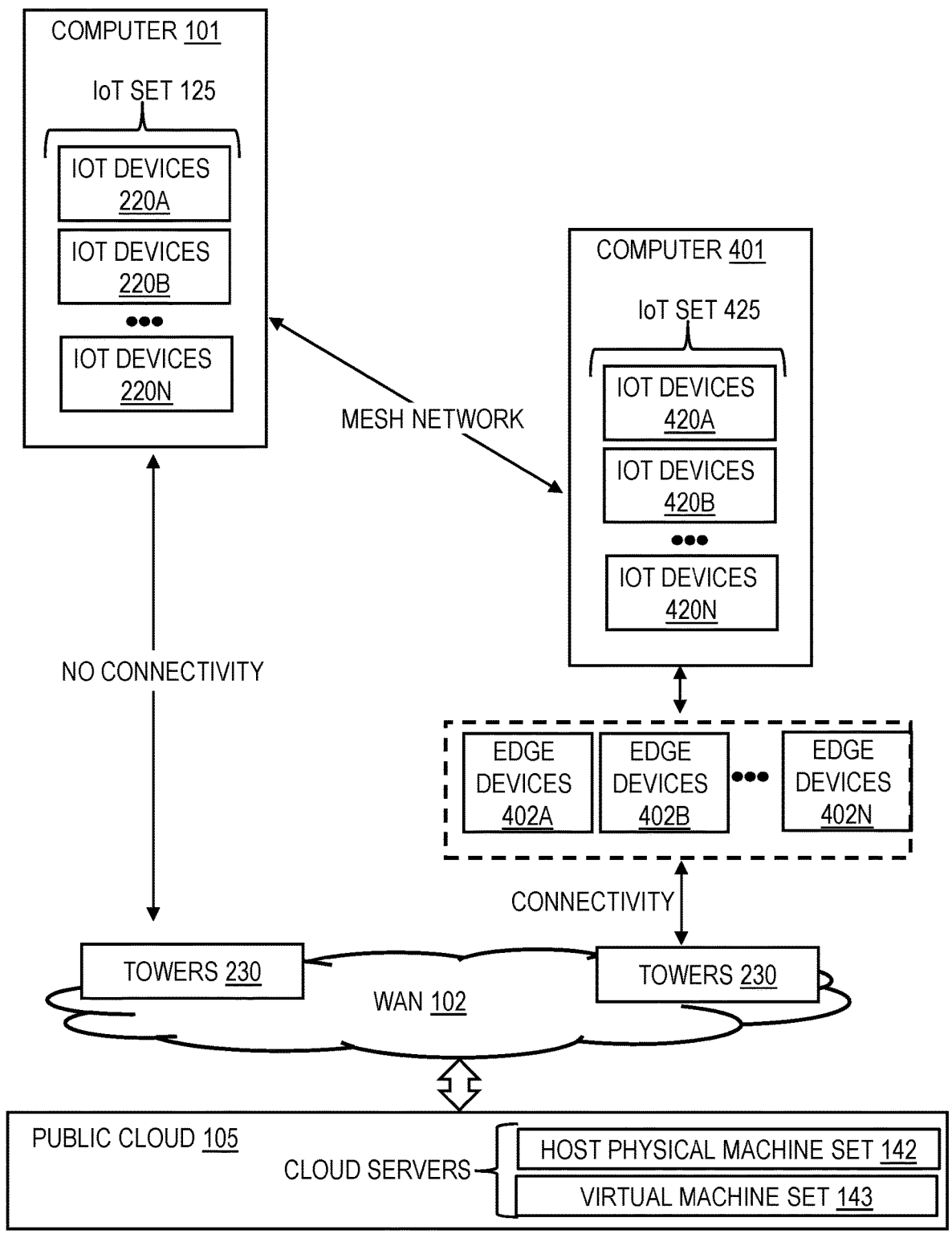
FIG. 4 depicts a block diagram of the example computing environment configured to provide predictive dynamic caching in edge devices and mesh connection when connectivity may be potentially lost according to one or more embodiments of the present invention.

FIG. 4 illustrates a portion of the computing environment 100 showing an abbreviated version of the computer 101 and another computer 401. The computer 401 may be analogous to the computer 101, although some details are omitted for the sake of clarity. For example, the IoT set 125 may be analogous to an IoT set 425 in the computer 401. Similarly, IoT devices 420A, 420B through 420N (generally referred to as IoT devices 420) in computer 401 are analogous to the IoT devices 220A, 220B through 220N in the computer 101. Edges devices 402A, 402B through 402N are analogous to the edge devices 202A, 202B through 202N (not shown in FIG. 4). The IoT devices 220 (and edge devices 402) on the transportation vehicle (e.g., ship 1) can communicate and operatively connect to the other IoT devices 420 on another transportation vehicle (e.g., ship 2) so as to form a mesh network. A mesh network is a peer-to-peer network or device-to-device network. One or more embodiments can utilize mesh edge caching when the IoT devices 220 have a loss of cloud connectivity (to the WAN 102) to the cloud server on the public cloud 105. For example, the IoT devices 220 needing cloud computing can form a mesh network with the other IoT devices 420 where one or more members (e.g., one or more IoT devices 420 on ship 2) of the mesh collective still have cloud connectivity (i.e., connectivity to WAN 102). The mesh edge servers 402 connects to the cloud servers of the public cloud 105 on behalf of the registered IoT devices 220 in order to download required data from the cloud servers so that during the (potential) network outage, the edge caching can address the network outage, provide critical data, and/or store data in case of imminent catastrophic failure. In other words, the IoT devices 220 can access the cloud servers via the edge devices 402 in the mesh network. All connections are encrypted with payload segregation to support this multi-tenant solution.

In an example scenario, the predictive caching software 150 determines if a mesh network is available to form a mesh collective. When there is a loss of connectivity for the IoT devices 220 and edge devices 202 (of ship 1) to the WAN 102 but while the IoT devices 420 and the edge devices 402 still maintain connectivity to the WAN 102, the mesh collective is a peer-to-peer network that allows connection for off-loading the cache of critical data from edge devices 202 to the edge devices 402 and/or for continued downloading of edge computing capability from the cloud servers to the edge devices 202 via the edge devices 402.

It is noted that the new edge devices 402 can be introduced into the ecosystem during the network outage because of a pre-registration or agreement being in place prior to the origination of the network outage. Because of their proximity to one another, the other edge devices 402 and edge devices 202 can communicate peer-to-peer during the network outage because the pre-existing agreement is in place, thereby forming the mesh collective.

In one or more embodiments, the machine learning model 160 can include various engines/classifiers and/or can be implemented on a neural network. The features of the engines/classifiers can be implemented by configuring and arranging the computer 101 to execute machine learning algorithms which form the machine leaning models. In general, machine learning algorithms, in effect, extract features from received data (e.g., input of current data 152) in order to "classify" the received data. Examples of suitable classifiers include but are not limited to neural networks, support vector machines (SVMs), logistic regression, decision trees, hidden Markov Models (HMMs), random forest, K-nearest neighbor, Naïve Bayes, etc. The end result of the classifier's operations, i.e., the "classification," is to predict a class for the data. The machine learning algorithms apply machine learning techniques to the received data in order to, over time, create/train/update a unique "model." The learning or training performed by the engines/classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In one or more embodiments, the engines/classifiers are implemented as neural networks (or artificial neural networks), which use a connection (synapse) between a pre-neuron and a post-neuron, thus representing the connection weight. Neuromorphic systems are interconnected elements that act as simulated "neurons" and exchange "messages" between each other. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. After being weighted and transformed by a function (i.e., transfer function) determined by the network's designer, the activations of these input neurons are then passed to other downstream neurons, which are often referred to as "hidden" neurons. This process is repeated until an output neuron is activated. Thus, the activated output neuron determines (or "learns") and provides an output or inference regarding the input.

Neural networks are usually created with base networks and based on requirements. Example base networks utilized may include RESNET 50, RESNET 10, Xception, etc. It should be appreciated that other base networks could be utilized for images. After the creation of the neural network, the dataset (training and testing) is fed to the model with the specific loss function and the training is started. Training consists of different hyperparameters that need to be set in order to achieve better accuracy. The dataset that is fed into the deep learning model is processed, and this is called data preparation and augmentation.

For illustration and not limitation, the training datasets may include historical data and knowledge of previous network outages for transportation vehicles, weather data, patterns of network outages in an area such as a geolocations where network connectivity is lost, disaster information, SoS notifications, notifications of military actions, etc. Supervised learning can be utilized in which the training data is classified/labeled and then fed to the neural network. The raw dataset can be collected and sorted manually. The sorted dataset can be labeled/classified (e.g., using the Amazon Web Services® (AWS®) labeling tool). The labeling tool creates segmentation masks or labeled data. Training and validation are used for training and evaluation, while testing is used after training to test the machine learning model on an unseen dataset. The training dataset may be processed through different data augmentation techniques. Training takes the labeled datasets, base networks, loss functions, and hyperparameters. Once these are all created and compiled, the training of the neural network occurs to eventually result in the trained machine learning model, such as trained machine learning model 160. Once the model is trained, the model (including the adjusted weights) is saved to a file for deployment and/or further testing on the test dataset.

FIG. 5 is a flowchart of a computer-implemented method 500 for predictive dynamic caching in edge devices when connection between IoT devices and cloud servers may be potentially lost according to one or more embodiments. Reference can be made to any of the figures discussed herein. At block 502 of the computer-implemented method 500, the predictive caching software 150 is configured to register devices (e.g., IoT devices 220) that require a connectivity to a cloud server (e.g., cloud servers in the public cloud 106) via a network (e.g., WAN 102 or another suitable network). At block 504, the predictive caching software 150 is configured to predict a likelihood (i.e., a network outage is expected) of a network outage (i.e., predicted/potential network outage) of the connectivity to the network for the devices (e.g., registered IoT devices 220) having been registered. At block 506, the predictive caching software 150 is configured to determine data to cache for each of the devices by analyzing traffic for each of the devices to the cloud server (e.g., analyzing traffic between the IoT devices 220 and the cloud servers), at least one piece of the data being currently in use by at least one of the devices (e.g., IoT devices 220A). At block 508, responsive to predicting the likelihood of the network outage (i.e., the predicted/potential network outage), the predictive caching software 150 is configured to cache the data to edge devices 202. At block 510, responsive to the connectivity to the network being restored (i.e., the IoT devices 220 once again have connectivity to the WAN 102), the predictive caching software 150 is configured to remove the data cached on the edge devices 202. The predictive caching software 150 may cause the software 206 to remove/delete the cached in the respective edge device 202 prior to deactivation.

Further, the edge devices 202 are activated in response to predicting the likelihood of the network outage, such that a sufficient number of the edge devices 202 are activated to accommodate a size of the data to be cached. Caching the data to the edge devices 202 comprises downloading, to the edge devices 202 from the cloud server, the data that is potentially required for the devices (e.g., IoT devices 220).

A loss of the connectivity for the network outage is predicted to be associated with at least one factor, the at least one factor selected from the group comprising a duration for the loss of the connectivity and a distance for the loss of the connectivity. The distance corresponding to a distance to be traveled for a transportation vehicle/mobile platform having the IoT devices 220 and edge devices 202. In response to the connectivity being restored (between the IoT devices 220 and the WAN 102, the edge devices 202 are sequentially deactivated. The devices (e.g., IoT devices 220 along with edge devices 202) are associated with a mobile platform. A machine learning model 160 is configured to predict the likelihood of the network outage, where the machine learning model 160 is trained on historical data (e.g., training data 162, historical/knowledge corpus, etc.) associated with previous network outages of transportation vehicle and similar transportation vehicles having traveled the same or nearby routes.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    registering devices that require a connectivity to a cloud server via a network, the devices being identified in a table;
    predicting a likelihood of a network outage of the connectivity to the network for the devices having been registered;
    determining data to cache for each of the devices by analyzing traffic for each of the devices to the cloud server, at least one piece of the data being currently in use by at least one of the devices;
    responsive to predicting the likelihood of the network outage, caching the data to edge devices, the edge devices being identified in the table and associated in the table with the devices, the data to cache being determined in accordance with the table; and
    responsive to the connectivity to the network being restored, removing the data cached on the edge devices;
    wherein the edge devices are activated in response to predicting the likelihood of the network outage, a sufficient number of the edge devices being activated to accommodate a size of the data to be cached;
    wherein a loss of the connectivity for the network outage is predicted to be associated with at least one factor, the at least one factor selected from the group consisting of a duration for the loss of the connectivity and a distance for the loss of the connectivity; and
    wherein a machine learning model is configured to predict the likelihood of the network outage, the machine learning model being trained on historical data associated with previous network outages.

2. The computer-implemented method of claim 1, wherein caching the data to the edge devices comprises downloading, to the edge devices from the cloud server, the data that is potentially required for the devices.

3. The computer-implemented method of claim 1, wherein, in response to the connectivity being restored, the edge devices are sequentially deactivated.

4. The computer-implemented method of claim 1, wherein the devices are associated with a mobile platform.

5. A system comprising:
    a memory having computer readable instructions; and
    a computer for executing the computer readable instructions, the computer readable instructions controlling the computer to perform operations comprising:
        registering devices that require a connectivity to a cloud server via a network, the devices being identified in a table;
        predicting a likelihood of a network outage of the connectivity to the network for the devices having been registered;
        determining data to cache for each of the devices by analyzing traffic for each of the devices to the cloud server, at least one piece of the data being currently in use by at least one of the devices;
        responsive to predicting the likelihood of the network outage, caching the data to edge devices, the edge devices being identified in the table and associated in the table with the devices, the data to cache being determined in accordance with the table; and
        responsive to the connectivity to the network being restored, removing the data cached on the edge devices,
        wherein the edge devices are activated in response to predicting the likelihood of the network outage, a sufficient number of the edge devices being activated to accommodate a size of the data to be cached;
        wherein a loss of the connectivity for the network outage is predicted to be associated with at least one factor, the at least one factor selected from the group consisting of a duration for the loss of the connectivity and a distance for the loss of the connectivity; and
        wherein a machine learning model is configured to predict the likelihood of the network outage, the machine learning model being trained on historical data associated with previous network outages.

6. The system of claim 5, wherein caching the data to the edge devices comprises downloading, to the edge devices from the cloud server, the data that is potentially required for the devices.

7. The system of claim 5, wherein, in response to the connectivity being restored, the edge devices are sequentially deactivated.

8. The system of claim 5, wherein the devices are associated with a mobile platform.

9. A computer program product comprising a non-transitory computer readable storage medium having program instructions embodied therewith, the program instructions executable by a computer to cause the computer to perform operations comprising:
   registering devices that require a connectivity to a cloud server via a network, the devices being identified in a table;
   predicting a likelihood of a network outage of the connectivity to the network for the devices having been registered;
   determining data to cache for each of the devices by analyzing traffic for each of the devices to the cloud server, at least one piece of the data being currently in use by at least one of the devices;
   responsive to predicting the likelihood of the network outage, caching the data to edge devices, the edge devices being identified in the table and associated in the table with the devices, the data to cache being determined in accordance with the table; and
   responsive to the connectivity to the network being restored, removing the data cached on the edge devices;
   wherein the edge devices are activated in response to predicting the likelihood of the network outage, a sufficient number of the edge devices being activated to accommodate a size of the data to be cached;
   wherein a loss of the connectivity for the network outage is predicted to be associated with at least one factor, the at least one factor selected from the group consisting of a duration for the loss of the connectivity and a distance for the loss of the connectivity; and
   wherein a machine learning model is configured to predict the likelihood of the network outage, the machine learning model being trained on historical data associated with previous network outages.

10. The computer program product of claim 9, wherein caching the data to the edge devices comprises downloading, to the edge devices from the cloud server, the data that is potentially required for the devices.

11. The computer program product of claim 9, wherein, in response to the connectivity being restored, the edge devices are sequentially deactivated.

12. The computer program product of claim 9, wherein the devices are associated with a mobile platform.

\* \* \* \* \*